United States Patent
Miyasaka

(10) Patent No.: US 7,309,133 B2
(45) Date of Patent: Dec. 18, 2007

(54) PROJECTOR AND PATTERN IMAGE DISPLAY METHOD

(75) Inventor: Noriaki Miyasaka, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 189 days.

(21) Appl. No.: 11/082,064

(22) Filed: Mar. 17, 2005

(65) Prior Publication Data

US 2005/0206859 A1    Sep. 22, 2005

(30) Foreign Application Priority Data

Mar. 19, 2004    (JP)    ............................. 2004-080458
Mar. 19, 2004    (JP)    ............................. 2004-080464

(51) Int. Cl.
*G03B 21/14* (2006.01)

(52) U.S. Cl. .................. 353/122; 353/69; 382/162

(58) Field of Classification Search ................ 353/122, 353/30, 31, 69; 382/162, 274, 165; 245/617; 349/5, 7; 345/617

See application file for complete search history.

(56) References Cited

U.S. PATENT DOCUMENTS 7,093,941 B2 * 8/2006 Kawashima et al. .......... 353/97

2004/0145708 A1 * 7/2004 Tanner et al. .................. 353/94

FOREIGN PATENT DOCUMENTS

JP    A 2000-241874    9/2000

\* cited by examiner

*Primary Examiner*—William C. Dowling
(74) *Attorney, Agent, or Firm*—Oliff & Berridge, PLC

(57) ABSTRACT

The present invention relates to a projector that projects projection light on a projection object to display an image, including an image formation module that can form a predetermined pattern image for displaying on the projection object; a zoom lens that can change the size of the projected light region on which the projection light is projected; a controller; an imager that images the projection object; and an imaging controller that calculates an exposure calculation value from an imaged image imaged by the imager and adjusts the exposure on the imager such that the calculated exposure calculation value is nearly equivalent to an exposure target value set by the controller, and wherein the controller acquires the image imaged by the imager, and changes an area of a specified color portion represented with a specified color in the pattern image which is formed in the image formation module such that a specified value of a gradient value of a specified color portion represented with the specified color becomes approximately equivalent to a desired gradient value in the acquired imaged image.

12 Claims, 8 Drawing Sheets

LIGHT VALVE FORMED IMAGE

IMAGED IMAGE

GRADIENT VALUES

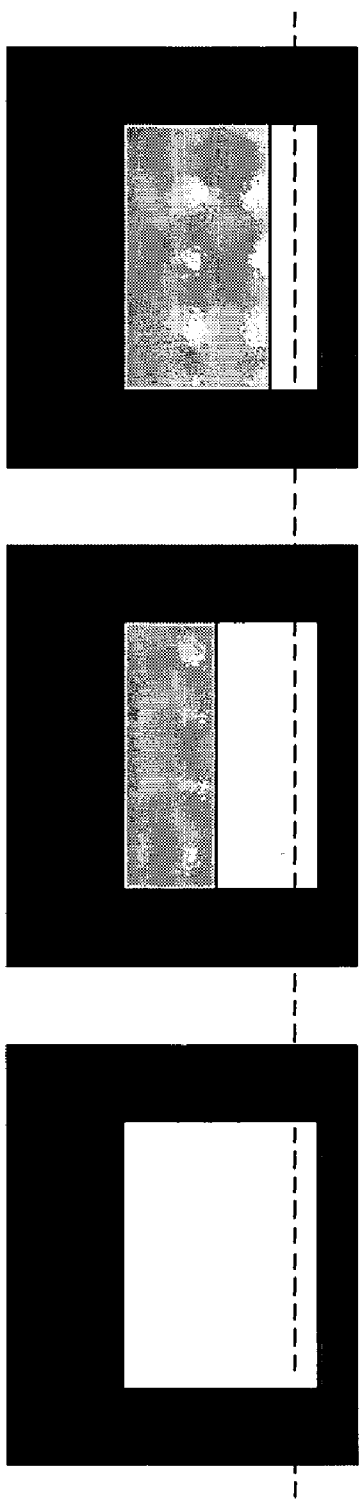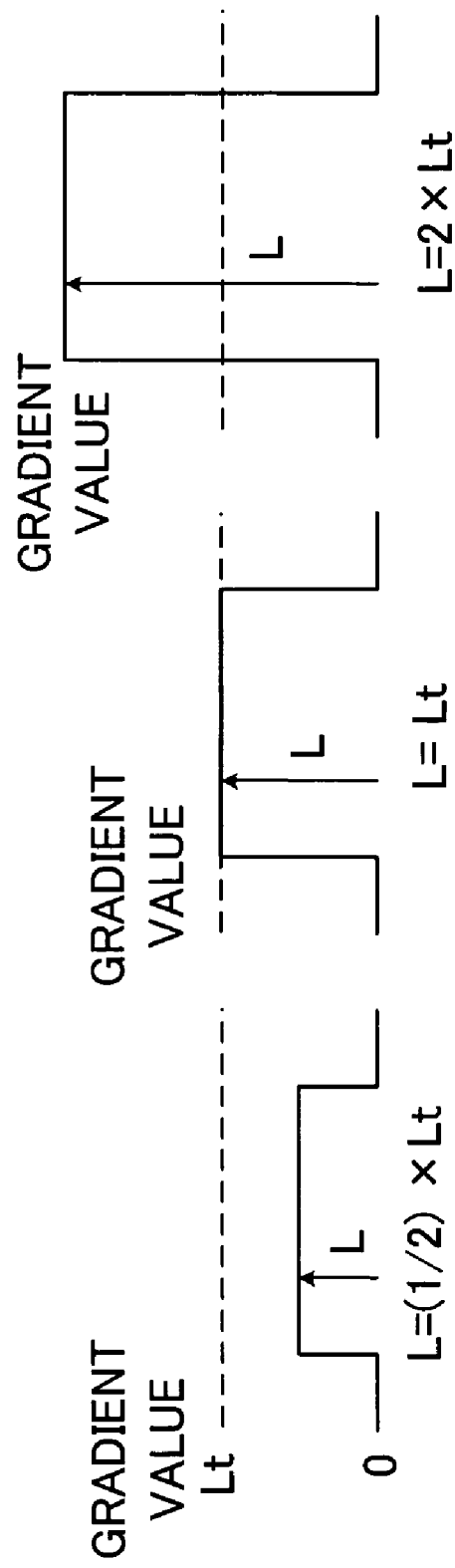

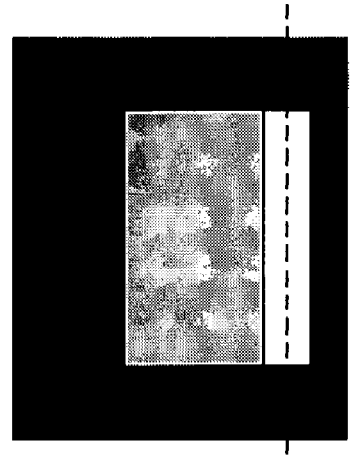
Fig.7(A) IMAGED IMAGE Sp=240,000
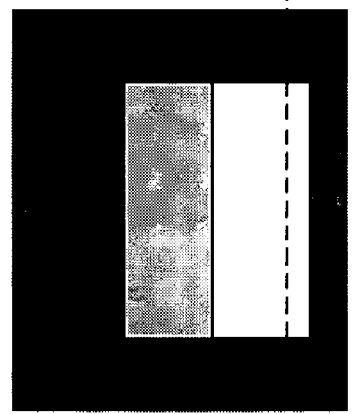
Fig.7(B) IMAGED IMAGE Sp=120,000=Spt
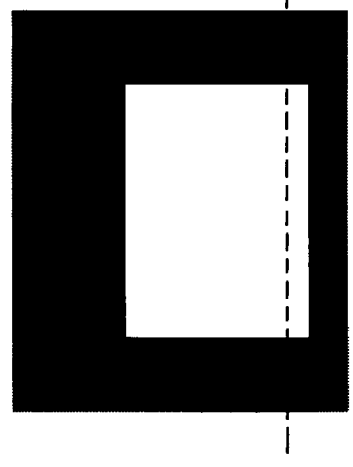
Fig.7(C) IMAGED IMAGE Sp=60,000
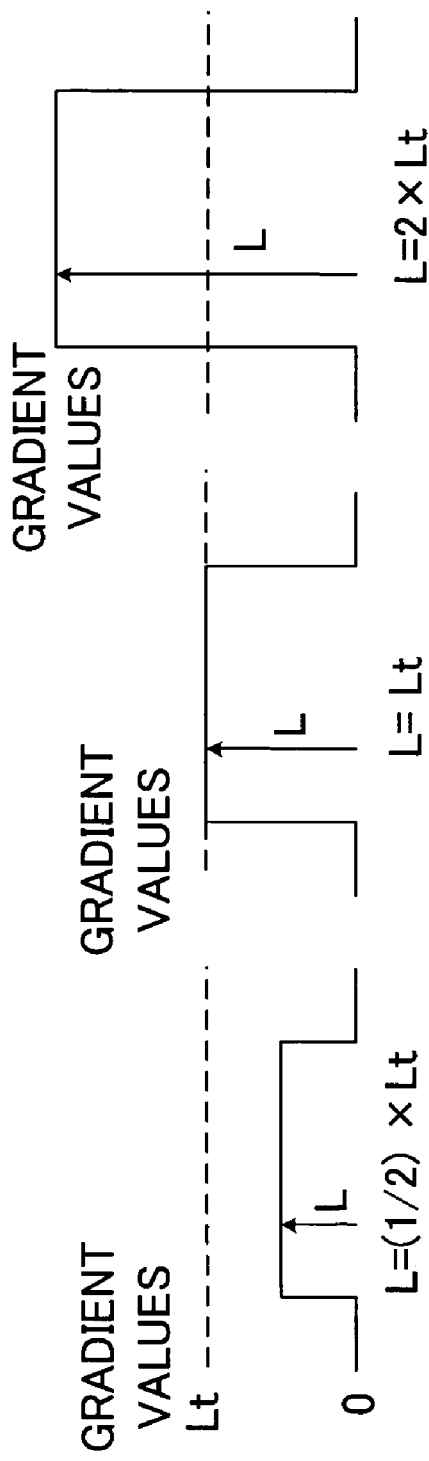

PROJECTOR AND PATTERN IMAGE DISPLAY METHOD

BACKGROUND OF THE INVENTION

1. Field of the Invention

The present invention relates to a projector for projecting projection light on a projection object such as a screen and displaying an image, and in particular, relates to a projector equipped with a zoom lens with which the size of the projection light region for projecting projection light can be changed, and an imager for imaging a projection object.

2. Description of the Related Art

In recent years, a projector equipped with a zoom lens as the projection lens is known where the size of the projection light region formed on the screen can be freely varied by driving the zoom lens to change its zoom position.

Also, when such a projector is positioned in front of a screen, a variety of adjustments need to be made such as zoom adjustment, keystone correction, and focus adjustment on the projector in advance so the image is displayed correctly on the screen by the projection light projected by the projector onto the screen.

With portable projectors, however, the relative position to the screen may change each time the projector is set up, so the operator must make the above such adjustments each time, which is extremely troublesome.

As conventionally described in, for example, Japanese Patent Laid-Open Gazettes No. 2000-241874, when setting up a projector provided with a monitor camera in front of a screen, an adjustment pattern image formed on a liquid crystal light valve is projected on the screen so as to be displayed in an enlarged form, the screen displaying the pattern image is imaged by the monitor camera, the imaged image is analyzed, and the above-mentioned adjustments are carried out automatically based on the results of the analysis.

In general, a monitor camera is provided with a charge-coupled device (CCD) or the like for converting incoming light to electrical signals, and has a function (automatic exposure) for varying the shutter speed, gain (sensitivity), aperture, and the like to make the overall light of the imaged image a set value (exposure target value).

FIG. 8 is an explanatory view for describing the effects of the automatic exposure of a conventional monitor camera. In FIG. 8, the upper section shows a screen on which an adjustment pattern image is displayed, the middle section shows an imaged image objected by imaging the screen with a monitor camera, and the bottom section shows the value representing the brightness of each pixel lined up along the center horizontal line (dotted line) in the imaged image. Also, (A) shows the normal state of a projector, and (B) shows the state when the projector is set to low luminance.

Note that the value that shows the brightness of each pixel for the imaged image is called the gradation value hereafter. The concerned gradation value is a value that is obtained from image signals of the imaged image output from the monitor camera (CCD module).

In FIG. 8, the adjustment pattern image formed on a liquid crystal light valve is completely white, and as shown in the top section, the area where the pattern image is displayed on the screen. In further detail, the white portion area is the above-mentioned projection light area.

Also, the imaged image obtained by imaging with the monitor camera is as shown in the middle section.

Also, the horizontal axis corresponds to the position of each pixel in the center horizontal line of the projected image, and the vertical axis displays the gradient value for each pixel.

If the light source lamp in the projector is set to low luminance, the luminance of the projection light projected by the projector will be lower than normal. Because of this, the brightness of the pattern image displayed on the screen is darker in FIG. 8(B) than in (A). When the pattern image is imaged by the monitor camera using automatic exposure, however, the shutter speed, gain, aperture, and the like are adjusted such that the brightness of the entire imaged image is appropriate even if the photographic subject is dark, so the brightness of the pattern image of the imaged image is no different than normal for (A), as shown in FIG. 8(B). The black portion (that is, the portion outside the projected light region) in the projected image is thus dark enough to be ignored, so the gradient values for each pixel in the black portion will be considered 0, while the gradient value of nearly each pixel in the white portion (in other words, the pattern image portion) will be unchanged at the desired gradient value of Lt.

The automatic exposure function of the monitor camera operates in this manner, so that even if the source light lamp is set to low luminance, and the brightness of the pattern image displayed on the screen is dark, the gradient value of nearly each pixel in the white portion (in other words, the pattern image portion) of the imaged image can be maintained at the desired gradient value of Lt, as with normal luminance. This is not limited to a low luminance setting, but works similarly as the luminance drops when the light source lamp deteriorates over the passage of time.

In a projector equipped with such a zoom lens and monitor camera, however, problems such as those below occur due to automatic exposure of the monitor camera when the zoom position of the zoom lens is changed, changing the size of the projection light area on the screen.

FIG. 9 is an explanatory view for describing the problem due to automatic exposure of the monitor camera in conventional cases where the zoom position is changed. As in FIG. 8, in FIG. 9, the upper section shows a screen on which an adjustment pattern image is displayed, the middle section shows an imaged image of the screen, and the bottom section shows gradient values of the pixels in the imaged image. Also, (A) shows the state when the zoom position of the zoom lens is positioned centrally, (B) shows the state when the zoom position of the zoom lens is set to wide angle, and (C) shows the state where the zoom position of the zoom lens is set to telephoto.

If the zoom position of the zoom lens in the projector is set to wide angle, the area of the projected light region on the screen increases as shown in the top section of FIG. 9(B) compared to the central position in (A). Here, the adjustment pattern image formed on the liquid crystal light valve is fixed, so when the area of the projected light region increases on the screen, the pattern image displayed on the screen expands in accompaniment thereto. Consequently when the pattern image is imaged by the monitor camera, the area of the white portion (in other words, the pattern image portion) in the imaged image thus increases as shown in the center section of FIG. 9(B) compared to the central position of (A), and the area of the black portion (in other words, the portion outside the projected light region) decreases.

At this time, if the imaging is carried out with automatic exposure, the brightness of the overall imaged image is calculated as an exposure calculation value, which is controlled by the shutter speed, gain, aperture, and the like, such as to become equivalent to the exposure target value set beforehand. Here, the brightness of the overall imaged image is the sum of the amount of the light detected at each pixel with the CCD converted and amplified, of which the value is proportionate to the average value of the gradient value for each pixel in the imaged image. Thus, the average gradient value of all the pixels in the imaged image is used for the exposure calculated value.

Generally, the exposure target value is a fixed value set beforehand, so in cases where the zoom position is the central position as shown in FIG. 9(A), if the exposure calculation value matches the exposure target value, and the area of the white portion of the imaged image is made larger with the zoom position set to wide as described above, the average gradient value, that is, the exposure calculation value, of all the pixels will increase beyond the exposure target value by the amount that the area of the white portion was made larger. As a result, when the automatic exposure functions so as to change the shutter speed, gain, aperture, and the like such that the exposure calculation value is equivalent to the exposure target value, the average gradient value of all the pixels in the imaged image decreases. As described above, the black portion in the imaged image is black enough that it can be ignored, and the gradient value of each pixel therein is considered 0, so the decrease in the average gradient value of all the pixels is nothing more nor less than the gradient value of each pixel in the white portion decreasing below the desired gradient value Lt as shown in the bottom section of FIG. 9(B).

For a portion in an imaged image where, for example, the gradient values of the pixels are not 0 but are under a given threshold, said portion may be determined as being outside the projected light region, and the gradient values of the pixels in that portion replaced with zeros and the calculation made.

Alternatively, if the zoom position of the zoom lens is set to telephoto, the area of the projected light region on the screen is smaller as shown in the top section of FIG. 9(C) than the central position of (A). Here, the pattern image formed on a liquid crystal light valve is fixed as describe above, so when the area of the projected light region on the screen becomes smaller, the pattern image displayed on the screen shrinks along with it. When the pattern image is imaged by the monitor camera, then, the area of the white portion (in other words, the pattern image portion) in the imaged image becomes smaller as shown in the center section of FIG. 9(C) than the central position of (A), and the area of the black portion (in other words, the portion outside the projected light region) becomes larger.

When the area of the white portion in the imaged image thus becomes smaller, the average gradient value of all the pixels, that is, the exposure calculation value, decreases below the exposure target value by the amount that the area becomes smaller. As a result, when the automatic exposure functions so as to change the shutter speed, gain, aperture, and the like such that the exposure calculation value is equivalent to the exposure target value, the average gradient value of all the pixels in the imaged image rises, the result of which is that gradient value of each pixel in the white portion rises above the desired gradient value Lt as shown in the bottom section of FIG. 9(C).

As described above, conventionally, when the zoom position of the zoom lens is set to wide angle, and the area of the projected light region on the screen becomes large, the gradient value of each pixel in the white portion of the imaged image decreases below the desired gradient value Lt due to automatic exposure of the monitor camera, and conversely, when telephoto is used and the area of the projected light region becomes small, the gradient value of each pixel in the white portion increases above the desired gradient level Lt, so in neither case can the average gradient value of the white portion be maintained at the desired gradient level Lt.

Accordingly, if the average gradient value of the white portion in the imaged image thus deviates from the desired gradient value $L_t$ due to a change in the zoom position of the zoom lens, the imaged image is analyzed as described above, and if various adjustments are to be carried out automatically based on the results of the analysis, there was the problem that appropriate adjustments could not be carried out depending on the content of the adjustments.

This sort of problem is not limited to cases where the adjustment pattern image is completely white, but may occur when the adjustment pattern is a different given color other than white (for example, green, or the like), and when the color is not over the entire surface but only a part of it.

SUMMARY OF THE INVENTION

The object of the invention is thus to eliminate the drawbacks of the prior art and to provide a technique with which the average gradient value of a specified portion represented with a specified color in an imaged image can be maintained at approximately a desired gradient value even if the zoom position of the zoom lens is changed.

In order to attain at least part of the above and the other related objects, the present invention is directed to a first projector that projects projection light on a projection object to display an image. The first projector includes: an image formation module that can form a predetermined pattern image for displaying on the projection object; a zoom lens that can change the size of the projected light region on which the projection light is projected; a controller; an imager that images the projection object; and an imaging controller that calculates an exposure calculation value from an imaged image imaged by the imager and adjusts the exposure on the imager such that the calculated exposure calculation value is nearly equivalent to an exposure target value set by the controller, and wherein the controller acquires the imaged image imaged by the imager, and changes an area of a specified color portion represented with a specified color in the pattern image which is formed in the image formation module such that a specified value of a gradient value of a specified color portion represented with the specified color becomes approximately equivalent to a desired gradient value in the acquired imaged image.

In the first projector of the present invention, the area of a specified color portion of a pattern image formed in an image formation module is thus changed so the specified value of the gradient value of the specified color portion in the imaged image becomes approximately equivalent to a desired gradient value. In further detail, the specified value of the gradient value of the specified color portion in an imaged image has a correlation with the area of the specified color portion in the pattern image formed on the image formation module, so even if the specified value of the gradient value of the specified color portion in the imaged image deviates from the desired gradient value due to a change in the zoom position of the zoom lens, it is possible to bring the average gradient value of the specified color portion in the imaged image closer to the desired gradient value by changing the area of the specified color portion in the pattern image formed in the image formation module, eventually making them nearly equivalent. Even if the zoom position of the zoom lens is changed, it is thus possible to maintain the average gradient value of the specified color portion in the imaged image at approximately the desired gradient value.

Also, in the first projector of the present invention, it is preferable that the specified value of the gradient value of the specified color portion is either an average, maximum or intermediate value of the gradient values of the specified color portion. These values represent representative characteristics of the gradient values of the specified color portion.

The present invention is also directed to a second projector that projects projection light on a projection object to display an image. The second projector includes: an image formation module that can form a predetermined pattern image for displaying on the projection object; a zoom lens that can change the size of the projected light region on which the projection light is projected; a controller; an imager that images the projection object; and an imaging controller that calculates an exposure calculation value from an imaged image imaged by the imager and adjusts the exposure on the imager such that the calculated exposure calculation value is nearly equivalent to an exposure target value set by the controller, and wherein the controller acquires an imaged image imaged by the imager, and changes an area of a specified color portion represented with a specified color in the pattern image which is formed on the image formation module such that a parameter relating to an area of a specified color portion represented with the specified color in the acquired imaged image becomes approximately equivalent to a target parameter set in advance.

In the second projector of the present invention, the area of a specified color portion of a pattern image formed in an image formation module is thus changed such that a parameter related to the area of a specified color portion of a imaged image becomes approximately equivalent to a target parameter. The area of the specified color portion of the imaged image has a correlation with the area of a specified color portion of the pattern image formed in the image formation module, so the parameter related to the area of the specified color portion of the imaged image can be changed by changing the area of the specified color portion of the pattern image formed in the image formation module. Once the area of the specified color portion of the imaged image is determined as the average gradient value of the specified color portion, it is finalized as that. Thus, if the value of the parameter related to the area of the specified color portion of the imaged image is set as the target parameter, for example, when the average gradient value of the specified color portion of the imaged image matches the desired gradient value, even if the average gradient value of the specified color portion of the imaged image deviates from the desired gradient value and the parameter related to the area of the specified color portion deviates from the target parameter due to a change in the zoom position of the zoom lens, it is possible to make the average gradient value of the specified color portion of the imaged image approximately equivalent to the desired gradient value by changing the area of the specified color portion of the pattern image formed in the image formation module such that the parameter related to the area of the specified color portion is approximately equivalent to the target parameter.

Thus, according to the second projector of the present invention, it is possible to maintain the average gradient value of a specified color portion in an imaged image at approximately a desired gradient value even if the zoom position of the zoom lens is changed.

In addition to the area itself, the number of pixels composing the specified color portion, the length of the dimension composing the specified color portion (for example, the length of one side in cases where the specified color portion is a rectangle, etc.) and the like are included as parameters related to the area of the specified color portion in the imaged image in the Scope of Claims and the Specification. Corresponding thereto, the target area, target number of pixels, target length, and the like are included as target parameters.

Also, in the projector of the present invention, the above-mentioned specified color may be white. Colors such as green, grey or the like may be used, for example, for specified colors other than white.

The present invention is not limited to a mode as a device invention such as the above-mentioned projector, but may be worked as a method invention such as a method to cause a projector to display a specified pattern image on a projection object.

BRIEF DESCRIPTION OF THE DRAWINGS

FIG. 5 is an explanatory view showing an imaged image and gradient values of each pixel in the imaged image.

FIG. 7 is an explanatory view showing an imaged image and gradient values of each pixel in the imaged image.

DESCRIPTION OF THE PREFERRED EMBODIMENTS

Modes for working the present invention are described based on embodiments in the below sequence.
A. Embodiment 1
A-1. The construction of the projector
A-2. The image projection operation
A-3. The operation for varying the pattern image
A-4. Concrete examples
A-5. Effects of the embodiment
B. Embodiment 2
B-1. The construction of the projector
B-2. The image projection operation
B-3. The operation for varying the pattern image
B-4. Concrete examples
B-5. Effects of the embodiment
C. Variants
C-1. Variant 1
C-2. Variant 2

C-3. Variant 3
C-4. Variant 4

A. Embodiment 1

A-1. The Construction of the Projector

Figure 1:
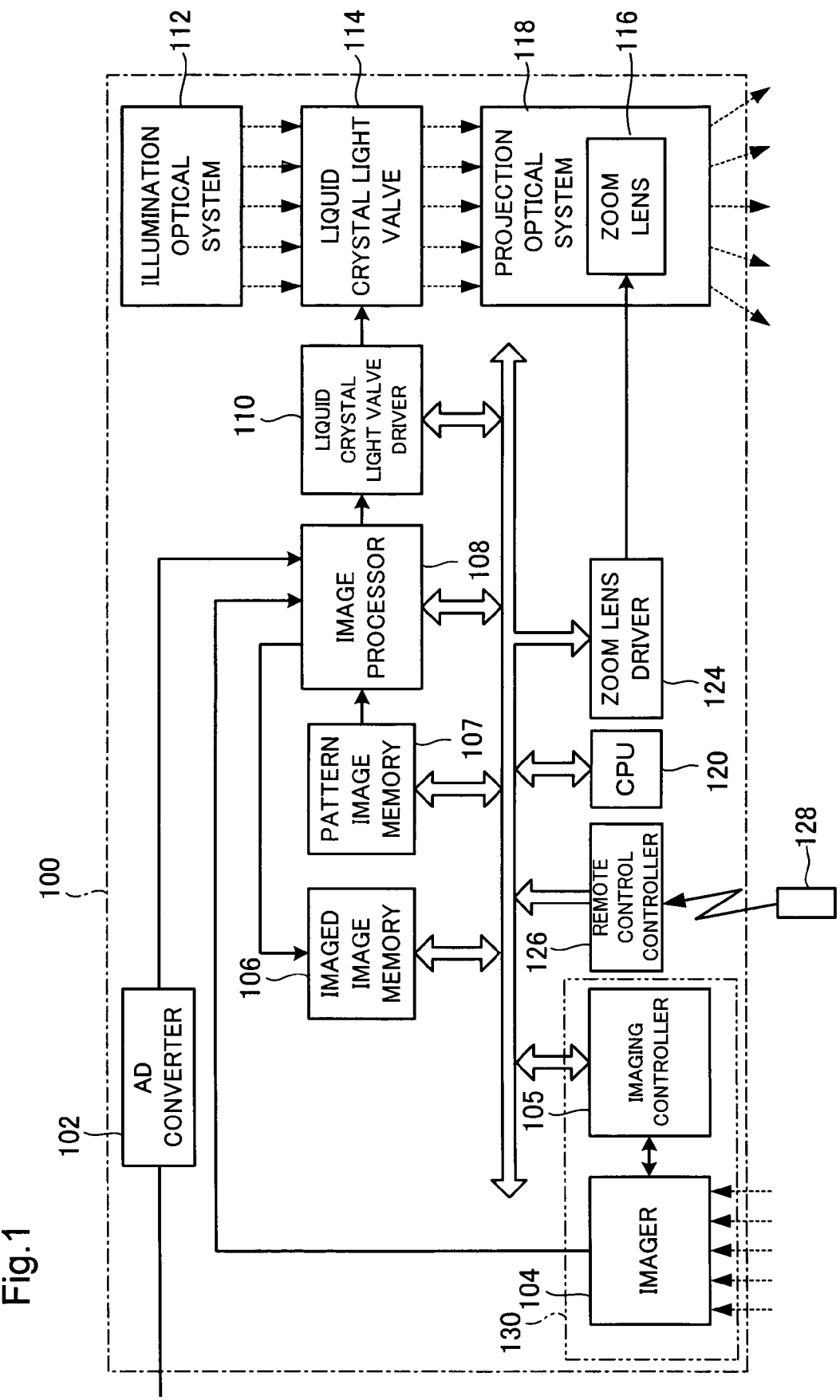
FIG. 1 is a block view showing the construction of a projector as Embodiment 1 of the present invention.

FIG. 1 is a block view showing a construction of the projector as Embodiment 1 of the present invention. This projector 100 is portable, and is equipped with an AD converter 102, an imager 104, an image controller 105, an imaged image memory 106, a pattern image memory 107, an image processor 108, a liquid crystal light valve driver 110, an illumination optical system 112, a liquid crystal light valve 114, a projection optical system 118 provided with a zoom lens 116, a CPU 120, a zoom lens driver 124, a remote control controller 126, and a remote control 128. Of these, the CPU 120 corresponds to the controller in the Claims, and the liquid crystal light valve 114, which is an electrooptical device, corresponds to the image formation module in the Claims.

In FIG. 1, the CPU 120 is depicted as being connected to only the image controller 105, the imaged image memory 106, the pattern image memory 107, the image processor 108, the liquid crystal light valve driver 110, the zoom lens driver 124, and the remote control controller 126 through a bus, but in actuality, it is connected to other constituent parts as well. Also, the imager 104 is equipped with a CCD, and the imager 104 and image controller 105 compose a CCD module 130 as a monitor camera.

In the present embodiment, the imager 104 shown in FIG. 1 corresponds to the imager mentioned in the Claims, the image controller 105 to the image controller mentioned in the Claims, the liquid crystal light valve 114 to the image formation module mentioned in the Claims, the zoom lens 116 to the zoom lens mentioned in the Claims, and the CPU 120 to the controller in the Claims.

A-2. The Image Projection Operation

Next, the image projection operation, which is a normal operation for the projector 100, is briefly described.

In FIG. 1, when the user uses the remote control 128 to instruct image projection to begin, the remote control 128 transmits that inputted instruction to the remote control controller 126 through wireless communication. The remote control controller 126 transmits the instruction from the remote control 128 to the CPU 120 through the bus. The CPU 120 controls each constituent part including the image processor 108 based on those instructions, carrying out the image projection operation.

Image signals outputted from a video player, television, DVD player or the like, or image signals outputted from a personal computer are inputted, and the AD converter 102 converts those analog image signals to digital image signals, and outputs the result to the image processor 108. The image processor 108 adjusts the inputted digital image signals such that the display state of the image (for example, the luminance, contrast, synchronicity, tracking, color depth, hue, and the like) to a desired state, and outputs the result to the liquid crystal light valve driver 110.

The liquid crystal light valve driver 110 drives the liquid crystal light valve 114 based on the inputted digital image signals, and forms an image on the liquid crystal light valve 114. Illumination light emitted from the illumination optical system 112 is modulated in the liquid crystal light valve 114 in response to the formed image. The projection optical system 118 is attached to the front of a cabinet for the projector 100 and projects the projection light modulated by the liquid crystal light valve 114 onto a screen (not illustrated). The image is thereby projected and displayed on the screen.

A-3. The Operation for Varying the Pattern Image

Next, a pattern image variation operation, which is a characteristic part of the present invention, for the projector 100 is described in detail.

Conventionally, the adjustment pattern image formed on the liquid crystal light valve as described above, was fixed, but in the present embodiment, the area of the white portion in the adjustment pattern image formed on the liquid crystal light valve is changed so that the average gradient value of the white portion in the imaged image is approximately equivalent to a desired gradient value, so as to maintain the average gradient value of the white portion in the imaged image at approximately the desired gradient value even if the zoom position of the zoom lens 116 is changed.

When the user turns on the power to the projector 100 after setting it up at a desired location in front of the screen, the projector 100 causes the adjustment pattern image to be projected and displayed on the screen in order to make a variety of adjustments.

In concrete detail, when the CPU 120 generates an adjustment pattern image, writes the result to the pattern image memory 107 as digital image signals, and instructs the image processor 108, the liquid crystal light valve driver 110, and the like, to project the image, the image processor 108 reads the written digital image signals, and outputs them to the liquid crystal light valve driver 110. The liquid crystal light valve driver 110 drives the liquid crystal light valve 114 based on the inputted digital image signals, and forms an adjustment pattern image as described below on the liquid crystal light valve 114. The liquid crystal light valve 114 modulates illumination light emitted form the illumination optical system 112 in response to the formed pattern image. The projection optical system 118 projects the projection light modulated by the liquid crystal light valve 114 on the screen through the zoom lens 116, and the like. The adjustment pattern image is thereby displayed on the screen. The region where the adjustment pattern image is displayed is the projection light region.

In the present embodiment, the adjustment pattern image used is divided vertically, for example, into a top color and a bottom color, with the top portion black and the bottom portion white. The projection light region on the screen is therefore also divided into two colors vertically, with the top portion black and the bottom portion white.

After the pattern image is thus displayed on the screen, when the user next operates a zoom button (not illustrated) on the remote control 128 to adjust the size of the projection light region on the screen, thereby instructing the zoom position to move, the remote control 128 transmits the inputted instruction to the remote control controller 126 through wireless communication. The remote control controller 126 transmits the instruction from the remote control 128 to the CPU 120 via the bus. The CPU 120 controls the zoom lens driver 124 based on the instruction, drives the zoom lens 116 provided in the projection optical system 118, causing the zoom position of the zoom lens 116 to move. Then, when the projection light region on the screen reaches a desired size on the screen, the user operates the zoom button on the remote control 128 to instruct movement of the zoom position to stop, the CPU 120 controls the zoom lens driver 124 based on that instruction to cause movement of the zoom position of the zoom lens 116 to stop.

Also, the CPU 120 reads a pattern image variable processing program from a memory not illustrated and executes it. In concrete detail, the CPU 120 controls the constituent parts including the pattern image memory 107 according to the processing procedure shown in FIG. 2 to carry out a variable operation of the pattern image.

Figure 2:
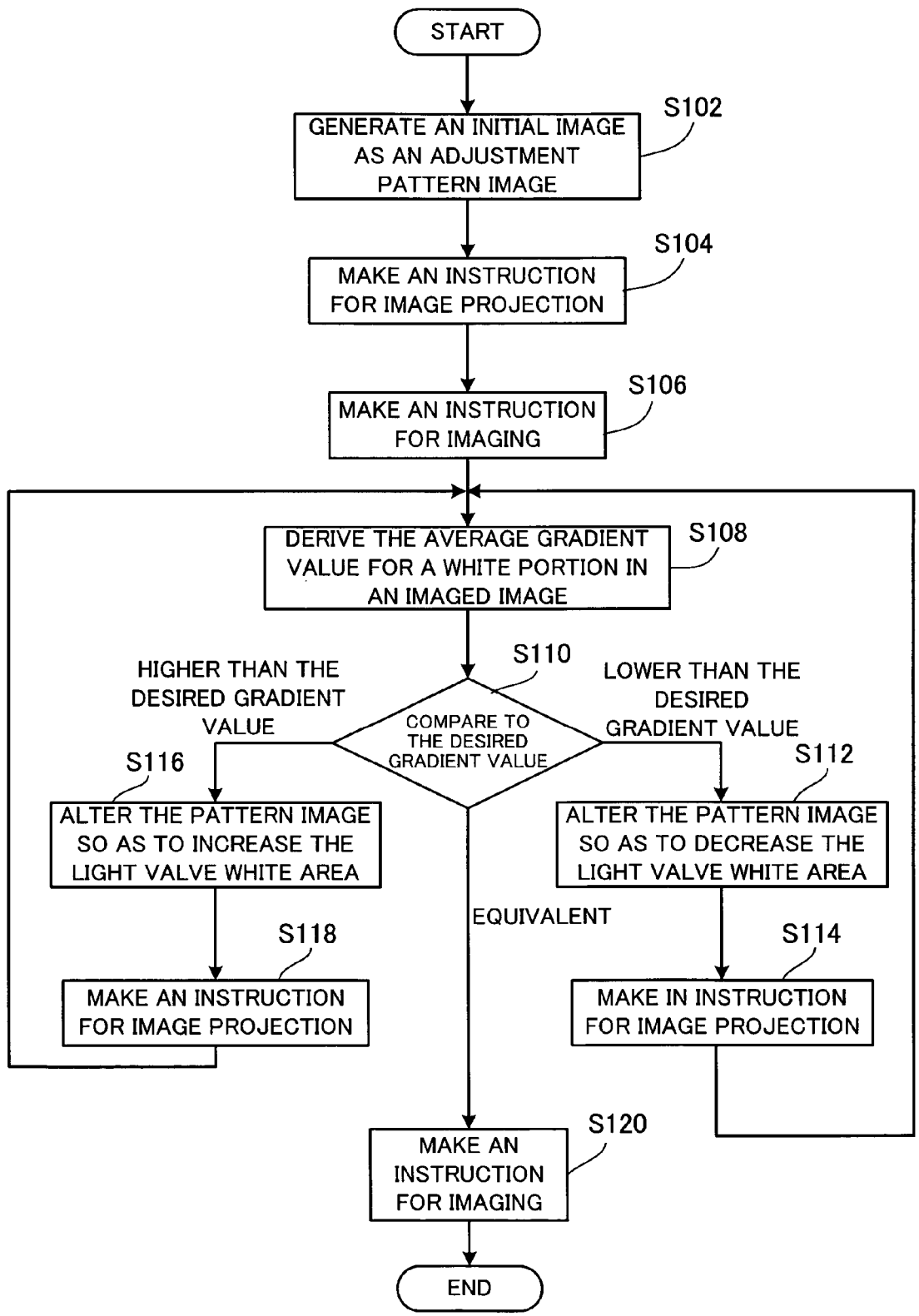
FIG. 2 is a flowchart showing a procedure for pattern image variable processing in the projector of Embodiment 1.

FIG. 2 is a flowchart showing a procedure for pattern image variable processing for the projector of the present embodiment.

When the processing shown in FIG. 2 begins, the CPU 120 generates an initial image decided in advance as an adjustment pattern image, writes it to the pattern image memory 107 as digital image signals (step S102), and instructs the image processor 108, liquid crystal light valve driver 110, and the like to project the image (step S104). An image divided top and bottom into black and white as described above may be used, for example, as the initial image; furthermore the image used has an area ratio of 50% each of the overall image for the black and white portions. Thus a pattern image divided equally top and bottom into black and white is formed on the liquid crystal light valve 114, and the pattern image is projected so as to be displayed enlarged on the screen.

After the power of the projector 100 is turned on, in cases where the adjustment pattern image generated by the CPU 120 as described above is such an initial image, steps S202 and S204 may be omitted. In the initial image, there may be at least a white portion, the shape and size of which is arbitrary.

Next, the CPU 120 instructs the image controller 105 to image (step S106). The image controller 105 thereby controls the imager 104, and imaging begins. The imager 104 images the screen on which the pattern image is displayed. Also, at this time, the image controller 105 calculates an average gradient value $L_{ccd}$ for all the pixels from the imaged image imaged by the imager 104 as the exposure calculation value, and carries out automatic exposure by controlling the shutter speed, gain, aperture, and the like in the imager 104 such that the exposure calculation value becomes equivalent to the exposure target value R set beforehand.

When the imager 104 thus images the screen on which the pattern image is displayed, it outputs the imaged image to the image processor 108 as digital image signals. After the desired processing is carried out on the inputted digital image signals, the image processor 108 writes them to the imaged image memory 106.

Next, the CPU 120 reads the digital image signals from the imaged image memory 106, acquires and analyzes the imaged image, and derives the average gradient value L of the white portion in the imaged image (step S108). Then, the CPU 120 reads a desired gradient value $L_t$ from a memory not illustrated, and compares it to the average gradient value L of the white portion (step S110).

Figure 3A:
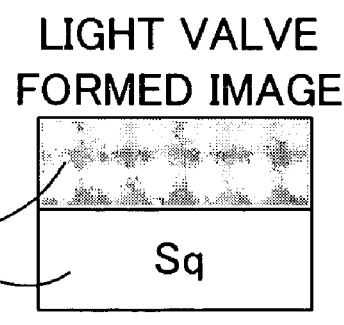
FIG. 3 is an explanatory view showing an adjustment pattern image formed in a liquid crystal light valve 114, an imaged image imaged by a CCD module 130, and gradient values of each pixel of the imaged image.
Figure 3B:
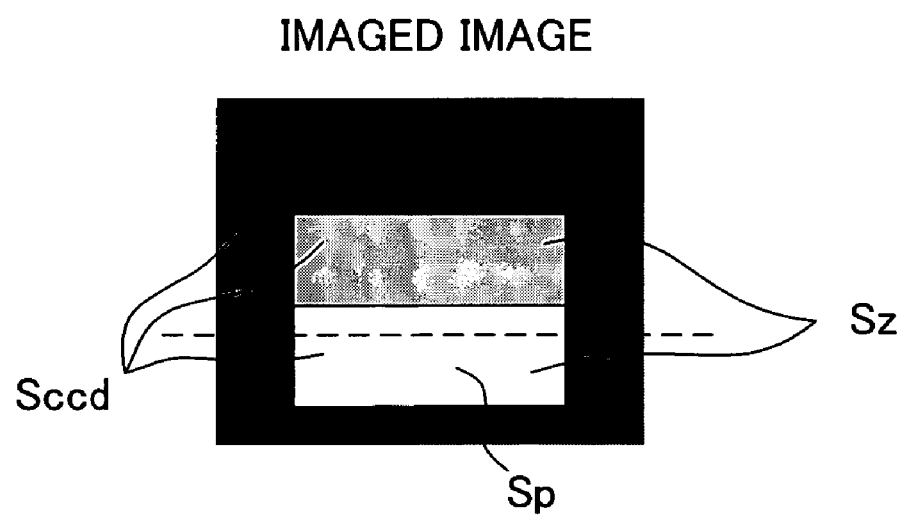
Figure 3C:

FIG. 3 is an explanatory view showing the adjustment pattern image formed by the liquid crystal light valve 114, the imaged image imaged by the CCD module 130, and the gradient values for each pixel in the imaged image. In FIG. 3, (A) is the adjustment pattern image formed on the liquid crystal light valve 114, (B) is the imaged image that was imaged by the CCD module 130 after the adjustment pattern image was projected enlarged so as to display on the screen, and (C) shows the gradient values for each pixel lined up in a prescribed horizontal line shown with a dotted line in the imaged image. As described above, the region in which the adjustment pattern image is displayed on the screen is a projection light region, so the projection light region portion corresponds to the adjustment pattern image in the imaged image as well.

In the present embodiment, an image divided vertically into two colors is used as the adjustment pattern image, with the top portion black and the bottom portion white as shown in FIG. 3(A), so for the portion of the projection light region in the imaged image, the top portion is black and the bottom portion is white, as shown in FIG. 3(B). Also, the portion outside the projected light region is the black portion. In particular, in the initial image, the ratio of the black portion and the white portion is half and half.

As shown in FIG. 3(B), the area of the white portion (that is, the bottom portion of the projected light region) in the imaged image is $S_p$, the area of the overall imaged image is $S_{ccd}$, and the average gradient value of all the pixels in the imaged image is $L_{ccd}$. Here, the black portion is dark enough that the black portion (that is, the top portion of the projection light region and the portion outside the projected light region) can be ignored, so the gradient value for all pixels in the black portion is 0. Accordingly, the average gradient value L of the white portion in the imaged image is represented by formula (1).

$$L=(S_{ccd} \times L_{ccd})/S_p \quad (1)$$

As described above, with automatic exposure, the average gradient value $L_{ccd}$ of all the pixels in the imaged image is used as the exposure calculation value, and the shutter speed, gain, aperture, and the like are controlled such that the exposure calculation value $L_{ccd}$ is equivalent to the exposure target value R. Accordingly, R is substituted for $L_{ccd}$ in formula (1) to result in formula (2).

$$L=(S_{ccd} \times R)/S_p \quad (2)$$

The exposure target value R is a constant, and the area $S_{ccd}$ of the overall imaged image is also a constant, so it is clear that the average gradient value L for the white portion of the imaged image from formula (2) is inversely proportional to the area Sp for the white portion of the imaged image.

As described above, the portion of the projection light region in the imaged image corresponds to the pattern image displayed on the screen, that is to say, the pattern image formed on the liquid crystal light valve 114. Accordingly, if the area of the projection light region of the imaged image is $S_z$ as shown in FIG. 3(B), the area of the overall pattern image formed on the liquid crystal light valve 114 is $S_{lv}$ as shown in FIG. 3(A), and the area of the white portion in the pattern image (hereinafter, abbreviated as the light valve white area) is $S_q$, the ratio (area ratio) of the area $S_p$ of the white portion to the area $S_z$ of the projection light region in the imaged image is the ratio (area ratio) of the light valve white area $S_q$ to the area $S_{lv}$ of the entire pattern image on the liquid crystal light valve 114, corresponding to the formula (3).

$$S_p/S_z = S_q/S_{lv} \quad (3)$$

Accordingly the area $S_p$ of the white portion in the imaged image is found with formula (4).

$$S_p = (S_q \times S_z)/S_{lv} \quad (4)$$

By thus substituting the value of formula (4) for $S_p$ in formula (2), formula (2) results in formula (5).

$$L=(S_{lv} \times S_{ccd} \times R)/(S_q \times S_z) \quad (5)$$

In formula (5), both the exposure target value R and the area $S_{ccd}$ of the overall imaged image are constants as above, and the area $S_{lv}$ of the overall pattern image on the liquid crystal light valve 114 is a constant as well. Further, currently, movement of the zoom position of the zoom lens 116 is stopped as described above, so the size of the projection light region on the screen does not change, and so the area $S_z$ of the projection light region in the imaged image is thus a constant also. Accordingly, it is clear that the average gradient value L of the white portion in the imaged image is inversely proportional to the light valve white area $S_q$.

From the above description, the result of comparing the average gradient value L of the white portion in the imaged image to the desired gradient value $L_t$ in step S110 in FIG. 2, is that if the average gradient value L of the white portion is not equivalent to the desired gradient value $L_t$, the light valve white area $S_q$ can be changed such that they become equivalent.

Figure 4C:
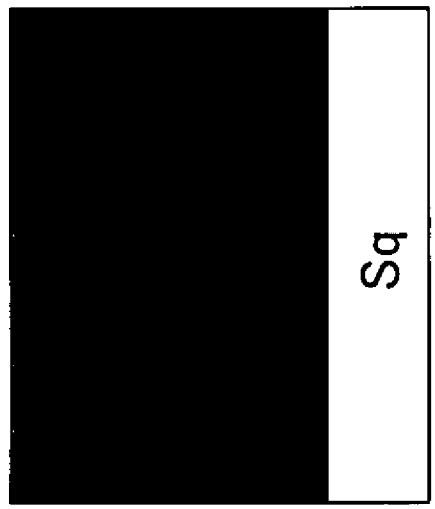
FIG. 4 is an explanatory view showing the appearance when the area of the white portion in a pattern image formed on the liquid crystal light valve 114 changes.
Figure 4B:
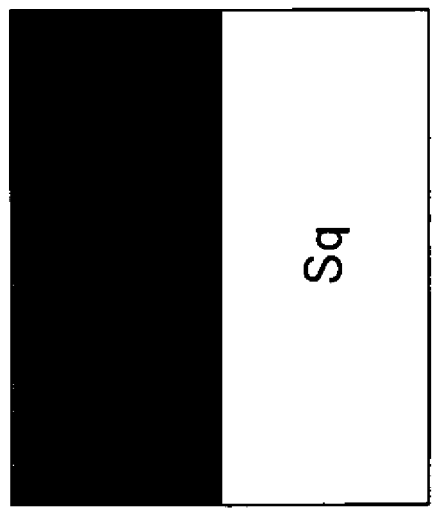

FIG. 4 is an explanatory view showing the situation when the area of the white portion in the pattern image formed on the liquid crystal light valve 114 changes. In FIG. 4, (B) is the initial image described above, (A) shows the case where the light valve white area $S_q$ is increased over the initial image, and (C) shows the case where, conversely, $S_q$ is made smaller. In this manner, the light valve white area $S_q$ is caused to change by changing the length of the vertical sides of the white portion in the pattern image formed on the liquid crystal light valve 114 while leaving the length of the horizontal sizes unchanged.

Accordingly, the result of the comparison in step S110 in FIG. 2 is that in the case where the average gradient value of the white portion is lower than the desired gradient value $L_t$, for example, the CPU 120 alters the adjustment pattern image, rewrites the contents of the pattern image memory 107 (step S112), and instructs the image processor 108, liquid crystal light valve driver 110, and the like to project the image (step S114) such that the light valve white area $S_q$ decreases as shown in FIG. 4(C) so that the average gradient value L of the white portion increases. A pattern image, altered so the area of the white portion on the liquid crystal light valve 114 (that is the light valve white area $S_q$) decreases, is thereby formed, and the altered pattern image is projected so as to be displayed enlarged on the screen. Then, the CPU 120 again acquires the imaged image from the imaged image memory 106 and deduces the average gradient value L of the white portion in the imaged image (step S108). At this time, the area $S_p$ of the white portion in the imaged image decreases because of the decrease in the light valve white area $S_q$, so the average gradient value L of the white portion increases inversely proportional thereto, approaching the desired gradient value $L_t$.

Conversely, when the average gradient value L of the white portion is higher than the desired gradient value $L_t$, the CPU 120 alters the adjustment pattern image, rewrites the contents of the pattern image memory 107 (step S116), and similarly instructs the image processor 108, liquid crystal light valve driver 110, and the like to project the image (step S118) such that the light valve white area $S_q$ increases as shown in FIG. 4 (A) so that the average gradient value L of the white portion decreases. A pattern image, altered so the area of the white portion on the liquid crystal light valve 114 (that is the light valve white area $S_q$) increases, is thereby formed, and the altered pattern image is projected so as to be displayed enlarged on the screen. The CPU 120 acquires the imaged image from the imaged image memory 106, and deduces the average gradient value L of the white portion in the imaged image (step S108). At this time, the area $S_p$ of the white portion ion the imaged image increases due to the increase in the light valve white area $S_q$, so the average gradient value L of the white portion decreases inversely proportional thereto, approaching the desired gradient value $L_t$.

Thereafter, processing is similarly repeated such that the average gradient value L of the white portion in the imaged image becomes equivalent to the desired gradient value $L_t$, and when the result of the comparison in step S110 is that the average gradient value L of the white portion is finally equivalent to the desired gradient value $L_t$, the CPU 120 instructs the imaged image memory 106 to image (step S120), and the pattern image variable processing in FIG. 2 ends.

Because the imager 104 is already imaging, the image controller 105 continues the imaging after the imager 104. Also, the imager controller 105 calculates the exposure calculation value from the imaged image from the imager 104, and carries out automatic exposure by controlling the shutter speed, gain, aperture, and the like in the imager 104 so the exposure calculation value is equivalent to the exposure target value R.

The imager 104 outputs the imaged image that was imaged to the image processor 108 as digital image signals, and after carrying out the desired processing on the digital image signals, the image processor 108 writes the result to the imaged image memory 106, updating the contents.

Then, the CPU 120 reads the digital image signals from the imaged image memory 106, acquires the imaged image, and analyzes the imaged image. Then, the CPU 120 carries out various adjustments based on the analysis results.

A-4. Concrete Examples

In this section, the drawings are used to describe concrete examples of the operation in cases where the average gradient value of the white portion in the imaged image is not equivalent to the desired gradient value $L_t$.

FIG. 5 is an explanatory view for showing the imaged image and gradient values of each pixel in the imaged image. In FIG. 5, the top section shows imaged images imaged by the CCD module 130, and the bottom section shows the gradient values of each pixel lined up along a prescribed horizontal line shown with a dotted line in the imaged images.

As an example, the area ratio of the white portion to the overall pattern image is 100% (that is, $S_p/S_z=S_q/S_{lv}=100\%$ in formula (3)) as shown in the top section of FIG. 5(A), and in the case where the average gradient value of the white portion in the imaged image is only half of the desired gradient value $L_t$, that is, $(\frac{1}{2}) \times L_t$, as shown in the bottom section of FIG. 5(A), the CPU 120 shortens the length of the vertical sides of the white portion such that the light valve white area $S_q$ decreases in order to increase the average gradient value L of the white portion. If this is done, when the area ratio of the white portion to the overall pattern image reaches 50% (that is, $S_p/S_z=S_q/S_{lv}=50\%$ in formula (3)) as shown in the top section of FIG. 5(B), for example, the average gradient value L of the white portion in the imaged image matches the desired gradient value $L_t$ as shown in the bottom section of FIG. 5(B).

Also, in the case where the area ratio of the white portion to the overall pattern image is 25% (that is, $S_p/S_z=S_q/S_{lv}=25\%$ in formula (3)) as shown in the top section of FIG. 5(C), the average gradient value L of the white portion in the imaged image is twice the desired gradient value $L_t$, that is, $2 \times L_t$, as shown in the bottom section of FIG. 5(C), the CPU 120 increases the length of the vertical sides of the white portion such that the light valve white area $S_q$ increases in order to decrease the average gradient value L of the white portion. If this is done, when the area ratio of the white portion to the overall pattern image reaches 50% (the top section of FIG. 5 (B) as described above, the average gradient value L of the white portion in the imaged image matches the desired gradient value $L_t$ (bottom section of FIG. 5(B)).

A-5. Effects of the Embodiment

In the present embodiment as described above, the zoom position of the zoom lens is changed and even if the average gradient value L of the white portion in the imaged image deviates form the desired gradient value $L_t$, the area of the white portion in the adjustment pattern image formed on the liquid crystal light valve is changed such that the average gradient valve becomes nearly equivalent to the desired gradient value. Thus, even if the zoom position of the zoom lens 116 is changed, it is possible to maintain the average gradient value of the white portion in the imaged image approximately equivalent to the desired gradient value $L_t$.

B. Embodiment 2

B-1. The Construction of the Projector

The construction of the projector as Embodiment 2 of the present invention is the same as that in Embodiment 1 shown in FIG. 1, so a description is omitted.

B-2. The Image Projection Operation

Also, the image projection operation, which is a normal operation for the projector of the present embodiment, is the same as that for the projector in Embodiment 1, so a description is omitted.

B-3. The Operation for Varying the Pattern Image

Next the pattern image variable operation, which is a characteristic part of the present embodiment for the projector 100, is described in detail.

Conventionally, the adjustment pattern image formed on a liquid crystal light valve was a constant as described above, but in the present embodiment, the average gradient value of the white portion in the imaged image is maintained at approximately a desired gradient value set in advance even if the zoom position of the zoom lens 116 is changed by a change in the area of the white portion of the adjustment pattern image formed on the liquid crystal light valve such that the area of the white portion in the imaged image is approximately equivalent to a target area.

When the user turns on the power of the projector 100 after setting it up in a desired position in front of a screen, the projector 100 projects an adjustment pattern image to be displayed on the screen in order to carry out a variety of adjustments.

In concrete detail, when the CPU 120 generates an adjustment pattern image, writes the image to the pattern image memory 107 as digital image signals, and instructs the image processor 108, liquid crystal light valve driver 110, and the like to project the image, the image processor 108 reads the written digital image signals, and outputs them to the liquid crystal light valve driver 110. The liquid crystal light valve driver 110 drives the liquid crystal light valve 114 based on the inputted digital image signals, and forms an adjustment pattern image described below on the liquid crystal light valve 114. The liquid crystal light valve 114 modulates illumination light emitted from the illumination optical system 112 in response to the formed pattern image. The projection optical system 118 projects projection light modulated by the liquid crystal light valve 114 on the screen through the zoom lens 116. The adjustment pattern image is thereby displayed on the screen. The region where the adjustment pattern image is displayed on the screen is the projection light region.

In the present embodiment, the adjustment pattern image used is divided vertically, for example, into a top color and a bottom color, with the top portion black and the bottom portion white. The projection light region on the screen therefore is also divided into two colors vertically, with the top portion black and the bottom portion white.

After the pattern image is thus displayed on the screen, when the user next operates a zoom button (not illustrated) on the remote control 128 to adjust the size of the projection light region on the screen, thereby instructing the zoom position to move, the remote control 128 transmits the inputted instruction to the remote control controller 126 through wireless communication. The remote control controller 126 transmits the instruction from the remote control 128 to the CPU 120 via the bus. The CPU 120 controls the zoom lens driver 124 based on the instruction, driving the zoom lens 116 equipped with the projection optical system 118, causing the zoom position of the zoom lens 116 to move. Then, when the projection light region reaches the desired size on the screen, the user operates the zoom button on the remote control 128 to instruct movement of the zoom position to stop, the CPU 120 controls the zoom lens driver 124 based on that instruction to cause movement of the zoom position of the zoom lens 116 to stop.

Also, the CPU 120 reads a pattern image variable processing program from a memory not illustrated and executes it. In concrete detail, the CPU 120 controls each constituent part including the pattern image memory 107 according to the processing procedure shown in FIG. 6 to carry out a variable operation for the pattern image.

Figure 6:
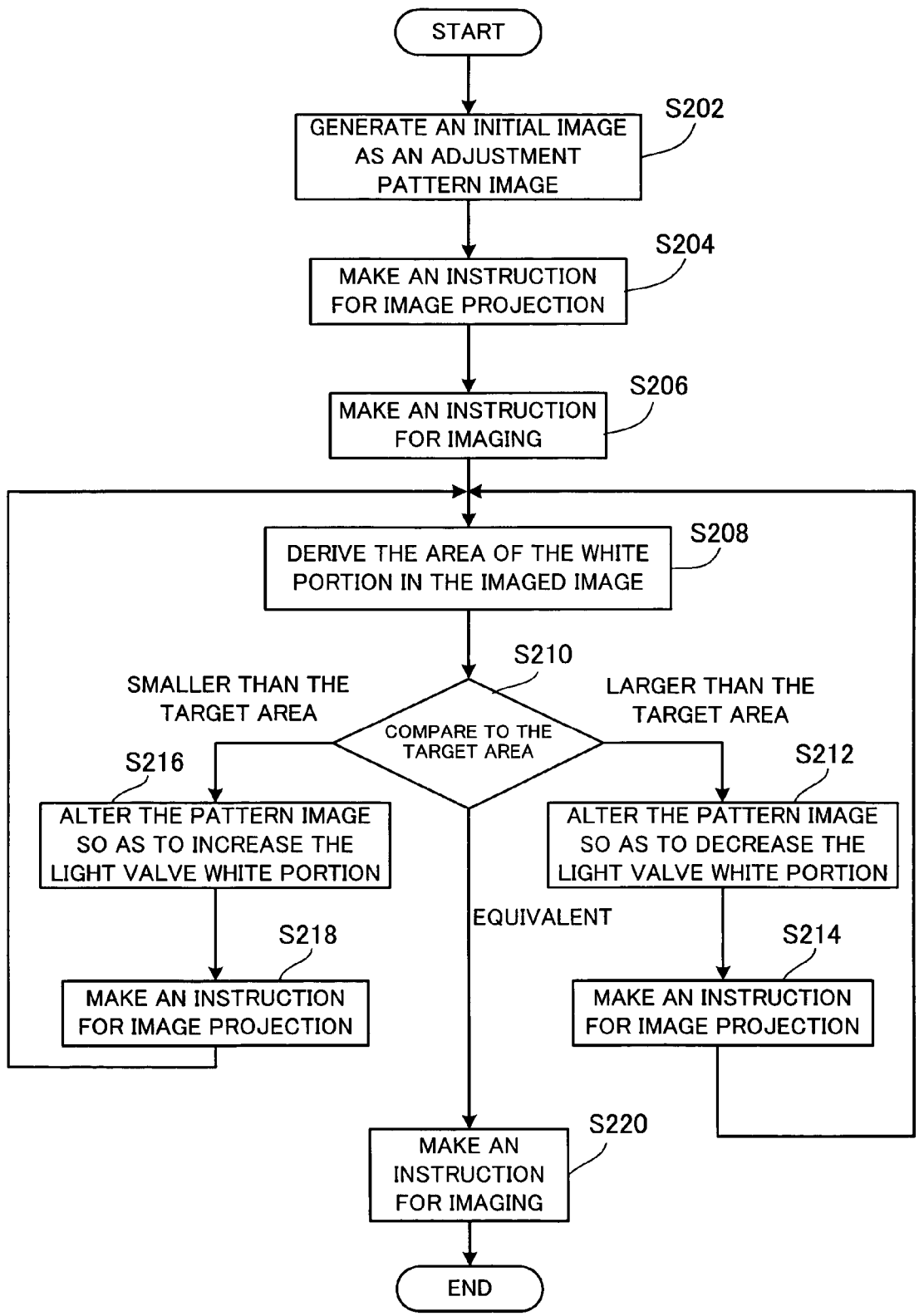
FIG. 6 is a flow chart showing a procedure for pattern image variable processing in the projector of Embodiment 2.
Figures 8A, 8B:
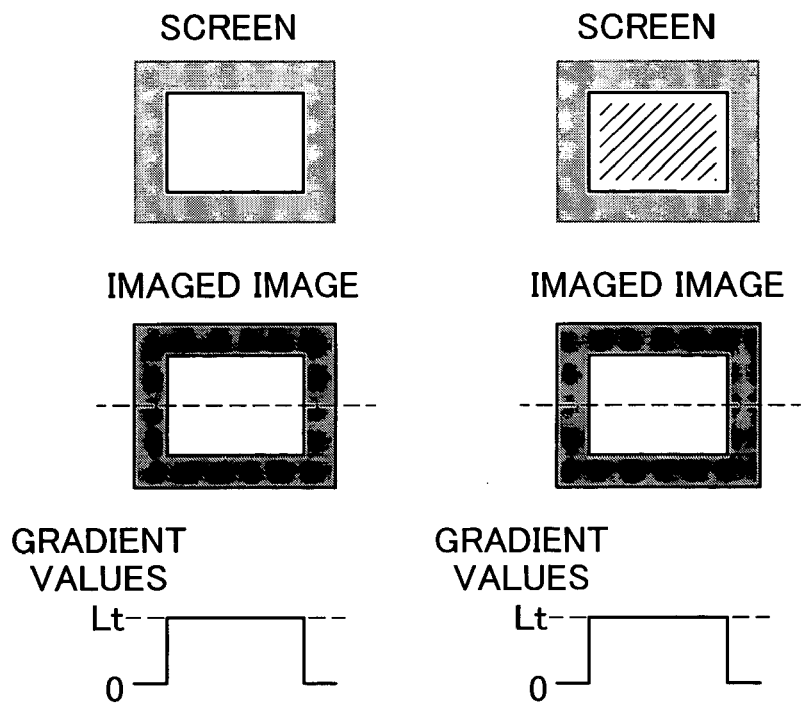
FIG. 8 is an explanatory view for describing the effects due to conventional automatic exposure with a monitor camera.
Figures 9A, 9B, 9C:
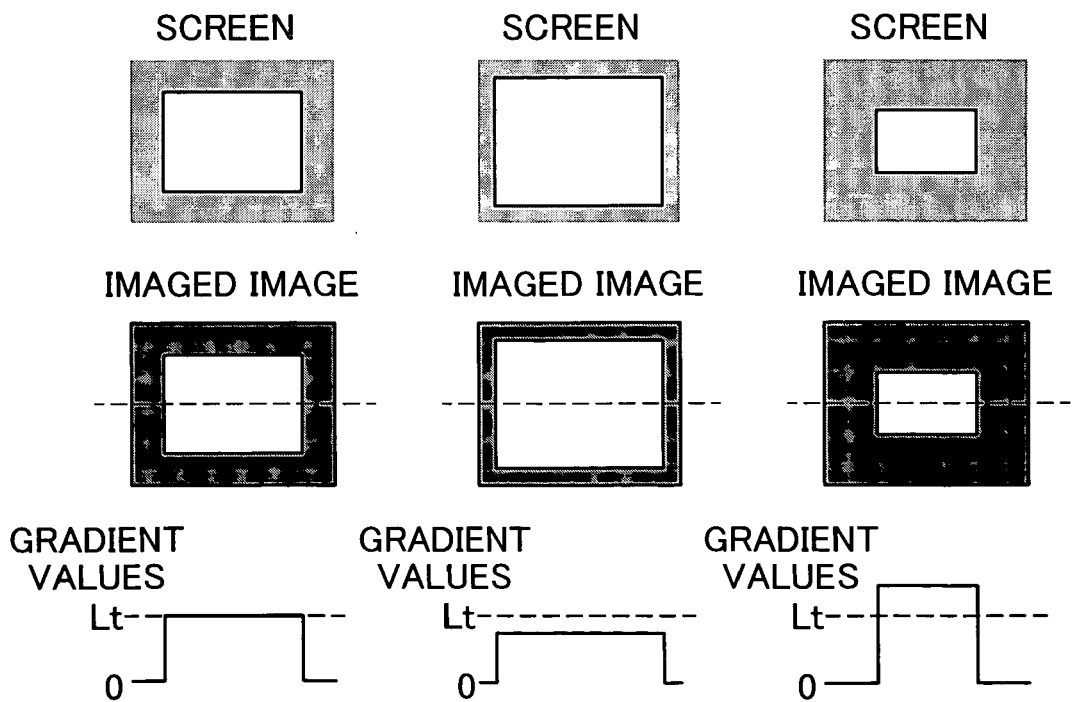
FIG. 9 is an explanatory view for describing a problem with conventional automatic exposure with a monitor camera when the zoom position is changed.

FIG. 6 is a flowchart showing a procedure for pattern image variable processing in the projector of the present embodiment.

When the processing shown in FIG. 6 begins, the CPU 120 generates an initial image decided in advance as an adjustment pattern image, writes it to the pattern image memory 107 as digital image signals (step S202), and instructs the image processor 108, the liquid crystal light valve driver 110, and the like to project the image (step S204). An image divided top and bottom into black and white as described above may be used, for example, as the initial image, furthermore the image used has an area ratio of 50% each of the overall image for the black and white portions. Thus a pattern image divided equally top and bottom into black and white is formed on the liquid crystal light valve 114, and the pattern image is projected so as to be displayed enlarged on the screen.

After the power of the projector 100 is turned on, in cases where the adjustment pattern image generated by the CPU 120 as described above is such an initial image, steps S202 and S204 may be omitted. In the initial image, there may be at least a white portion, the shape and size of which are arbitrary.

Next, the CPU 120 instructs the image controller 105 to image (step S206). The image controller 105 thereby controls the imager 104, and imaging begins. The imager 104 images the screen on which the pattern image is displayed. Also, at this time, the image controller 105 calculates an average gradient value $L_{ccd}$ for all the pixels from the imaged image imaged by the imager 104 as the exposure calculation value, and carries out automatic exposure by controlling the shutter speed, gain, aperture, and the like in the imager 104 such that the exposure calculation value becomes equivalent to the exposure target value R set beforehand.

When the imager 104 thus images the screen on which the pattern image is displayed, it outputs the imaged image to the image processor 108 as digital image signals. After the desired processing is carried out on the inputted digital image signals, the image processor 108 writes them to the imaged image memory 106.

Next, The CPU 120 reads the digital image signals from the imaged image memory 106, and acquires the imaged image as white and black signals after carrying out binarization. Then, the CPU 120 analyzes the acquired imaged image and deduces the area of the white portion in the imaged image (step S208). The area of the white portion is proportional to the number of white pixels, so the CPU 120 can induce the area of the white portion by counting the number of white pixels using the white-and-black binarized imaged image.

The adjustment pattern image formed on the liquid crystal light valve 114 and the imaged image imaged by the CCD module 130 are next described using FIG. 3, described above. In FIG. 3, (A) is an adjustment pattern image formed on the liquid crystal light valve 114, and (B) is the imaged image imaged by the CCD module 130 after the adjustment pattern image was projected so as to be displayed enlarged on the screen. As described above, the region in which the adjustment pattern image is displayed on the screen is the projection light region, so the portion of the projection light region corresponds to the adjustment pattern image for the projected image as well.

In the present embodiment, an image divided vertically into two colors is used as the adjustment pattern image, with the top portion black and the bottom portion white as shown in FIG. 3(A), so for the portion of the projection light region in the imaged image, the top section is black, and the bottom section is white as shown in FIG. 3(B). Also, portions outside the projection light region are black. The initial image is divided in half with the top half black and the bottom half white.

As shown in FIG. 3(B), if the area of the white portion in the imaged image (that is, the bottom portion of the projected light region) is $S_p$, the average gradient value of the white portion is L, the area of the entire imaged image is $S_{ccd}$, and the average gradient value of all the pixels in the imaged image is $L_{ccd}$, the relationship between the average gradient value and the area is as in formula (6).

$$L_{ccd}/L = S_p/S_{ccd} \tag{6}$$

Accordingly, the area $S_p$ of the white portion in the imaged image is represented with formula (7).

$$S_p = (L_{ccd} \times S_{ccd})/L \tag{7}$$

In the imaged image, the black portion (that is, the top portion of the imaged light region and the portion outside the projected light region) is dark enough to ignore, so the gradient value of each pixel in the black portion can be considered 0.

For portions of the imaged image where, for example, the gradient value of the pixels is not 0 but below a certain threshold, a determination may be made that the portion is the top portion of the projection light region or outside the projection light region and the calculation made after changing the gradient value of the pixels in that region changed to 0.

With automatic exposure, the average gradient value $L_{ccd}$ of each pixel in the imaged image is used as the exposure calculation value as described above, and the shutter speed, gain, aperture, and the like are controlled such that the exposure calculation value $L_{ccd}$ becomes equivalent to the exposure target value R. Accordingly, R may be substituted for $L_{ccd}$ in formula (2) so that formula (7) becomes formula (8).

$$S_p = (R \times S_{ccd})/L \tag{8}$$

Here, the exposure target value R is a constant, and the area $S_{ccd}$ of the overall imaged image is a constant, so it is clear that when the average gradient value L for the white portion in the imaged image is decided from formula (8), the area $S_p$ of the white portion in the imaged image is finalized.

When the area $S_p$ of the white portion in the imaged image is the target area $S_{pt}$ when the average gradient value L of the white portion in the imaged image matches the desired gradient value $L_t$, the target area $S_{pt}$ can be deduced from formula (8) as shown in formula (9).

$$S_{pt} = (R \times S_{ccd})/L_t \tag{9}$$

Thus, in order to maintain the average gradient value L of the white portion in the imaged image at approximately the desired gradient value $L_t$ without regard to changes in the zoom position of the zoom lens 116, the area $S_p$ of the white portion in the imaged image may be made the target area $S_{pt}$ without regards to changes in the zoom position.

As described above, the portion of the projection light region in the imaged image corresponds to the pattern image displayed on the screen, that is to say, the pattern image formed on the liquid crystal light valve 114. Accordingly, if the area of the projection light region in the imaged image is made $S_z$ as shown in FIG. 3(B), the area of the entire pattern image formed on the liquid crystal light valve 114 is made $S_{lv}$ as shown in FIG. 3(A), and the area of the white portion in the pattern image (hereinafter, abbreviated as the light valve white area) is made $S_q$, the ratio (area ratio) of the area $S_p$ of the white portion to the area $S_z$ of the projection light region in the imaged image is the ratio (area ratio) of the light valve white area $S_q$ to the area $S_{lv}$ of the entire pattern image on the liquid crystal light valve 114, as shown in formula (3).

$$S_p/S_z = S_q/S_{lv} \tag{3}$$

Accordingly, the area $S_p$ of the white portion in the imaged image is represented with formula (4).

$$S_p = (S_q \times S_z)/S_{lv} \tag{4}$$

In formula (4), the area $S_{lv}$ of the entire pattern image on the liquid crystal light valve 114 is a constant. Further, currently, movement of the zoom position of the zoom lens 116 is stopped as described above, so the size of the projected light region on the screen does not change, and so the area $S_z$ of the projection light region in the imaged image is also a constant. Accordingly, if the light valve white area $S_q$ is changed, it is clear from formula (4) that the area $S_p$ of the white portion in the imaged image will change.

From the above, it is possible to maintain the average gradient value L of the white portion in the imaged image at approximately the desired gradient value $L_t$ without regard to changes in the zoom position if the light valve white area $S_q$ is changed such that the area $S_p$ of the white portion in the imaged image becomes approximately equivalent to the target area $S_{pt}$ without regard to changes in the zoom position of the zoom lens 116.

The target area $S_{pt}$ is set in advance and stored in a memory, not illustrated. Returning to FIG. 6, the CPU 120 reads the target memory $S_{pt}$ from the memory and compares the area $S_p$ of the white portion deduced in step S208 to the target area $S_{pt}$ (step S210). If it is found in the comparison that the area $S_p$ of the white portion is not equivalent to the target area $S_{pt}$, the CPU 120 changes the light valve area $S_q$ such that they become equivalent.

The situation where the area of the white portion in the pattern image formed on the liquid crystal light valve 114 changes is next described using FIG. 4, described above. In FIG. 4, (B) is the initial image described above, (A) shows the case where the light valve white area $S_q$ was made larger than the initial image, and (C) shows the case where, conversely, $S_q$ was made smaller. In the present embodiment, the length of the horizontal sides of the white portion in the pattern image formed on the liquid crystal light valve 114 is thus left unchanged and the length of the vertical sides is changed to change the light valve white area $S_q$.

Consequently, in step S210 of FIG. 6, if the result of the comparison is that the area $S_p$ of the white portion is larger than the target area $S_{pt}$, the CPU 120 corrects the adjustment pattern image such that the light valve white area $S_q$ decreases as shown in FIG. 4(C), rewrites the contents of the pattern image memory 107 (step S212), and instructs the image processor 108, the liquid crystal light valve driver 110, and the like to project the image (step S214) so that the area $S_p$ of the white portion decreases. The corrected pattern image is thereby formed such that the light valve white area $S_q$ decreases on the liquid crystal light valve 114, and the corrected pattern image is projected as enlarged and displayed on the screen. Then, the CPU 120 again acquires the imaged image from the projection image memory 106, and deduces the area $S_p$ of the white portion in the imaged image (step S208). At this time, the area $S_p$ of the white portion in the imaged image decreases due to the decrease in the light valve white area $S_q$, so the target area $S_{pt}$ is approached.

Figure 4A:
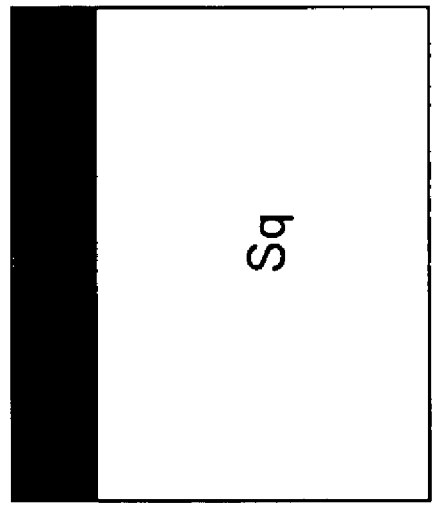

Conversely, if the area $S_p$ of the white portion is smaller than the target area $S_{pt}$, the CPU 120 corrects the adjustment pattern image such that the light valve white area $S_q$ increases as shown in FIG. 4(A), rewrites the contents of the pattern image memory 107 (step S216), and similarly instructs the image processor 108, the liquid crystal light valve driver 110, and the like to project the image (step S218) so that the area $S_p$ of the white portion increases. The corrected pattern image is thereby formed such that the light valve white area $S_q$ increases on the liquid crystal light valve 114, and the corrected pattern image is projected as enlarged and displayed on the screen. Then, the CPU 120 acquires the imaged image from the projection image memory 106, and deduces the area $S_p$ of the white portion in the imaged image (step S208). At this time, the area $S_p$ of the white portion in the imaged image increases due to the increase in the light valve white area $S_q$, so the target area $S_{pt}$ is approached.

After that, similar processing is repeated until the area $S_p$ of the white portion in the imaged image becomes equivalent to the target area $S_{pt}$, and if the result of the comparison in step S210 is that the area $S_p$ of the white portion is finally equivalent to the target area $S_{pt}$, the CPU 120 instructs the image controller 105 to project (step S220), and the pattern image variable processing shown in FIG. 6 ends.

The imager 104 is already being imaged, so the image controller 105 causes the imager 104 to continue to image. Also, the image controller 105 calculates the exposure calculation value from the image imaged by the imager 104, and carries out automatic exposure by controlling the shutter speed, gain, aperture, and the like in the imager 104 such that the exposure calculation value becomes equivalent to the exposure target value R.

The imager 104 outputs the imaged image to the image processor 108 as digital image signals, and after carrying out desired processing on the digital image signals, the image processor 108 writes them to the imaged image memory 106, updating the content.

The CPU 120 then reads the digital image signals from the imaged image memory 106, acquires the imaged image, and analyzes the imaged image. Then, the CPU 120 carries out various adjustments based on the analysis results.

B-4. Concrete Examples

Next, an operation is described in further concrete terms for cases where the area $S_p$ of the white portion in the imaged image is not equivalent to the target area $S_{pt}$ using the drawings.

FIG. 7 is an explanatory view showing an imaged image and gradient values of all the pixels in the imaged image. In FIG. 7, the top section shows the imaged image that was imaged by the CCD module 130, and the bottom section shows the gradient values of each pixel line up along a prescribed horizontal line shown with a dotted line in the imaged image.

For example, if the area $S_p$ of the white portion in the image is "120,000" when the average gradient value L of the white portion in the imaged image matches the desired gradient value $L_t$ as shown in FIG. 7(B), the target area $S_{pt}$ described above is "120,000". Accordingly, in the case where the average gradient value L of the white portion in the imaged image is merely half the desired gradient value $L_t$ as shown in the bottom section of FIG. 7(A), and the area $S_p$ of the white portion is "240,000" or twice the target value $S_{pt}$ as shown in the top section of FIG. 7(A), the CPU 120 shortens the length of the vertical sides of the white portion such that the light valve white area $S_q$ decreases to decrease the area $S_p$ of the white portion. If this is done, when the area $S_p$ of the white portion in the imaged image becomes equivalent to the target area $S_{pt}$ ("120,000") as shown in the top section of FIG. 7(B), the average gradient value L of the white portion matches the desired gradient value $L_t$ as shown in the bottom section of FIG. 7(B).

Also, in the case where the average gradient value L of the white portion in the imaged image is twice the desired gradient value $L_t$ as shown in the bottom section of FIG. 7(C), and the area $S_p$ of the white portion is merely "60,000" or half the target area $S_p$, the CPU 120 increases the length of the horizontal sides of the white portion such that the white valve white area $S_q$ increases to increase the target area $S_p$ of the white portion. If this is done, when the area $S_p$ of the white portion in the imaged image becomes equivalent to the target area $S_{pt}$ ("120,000"), the average gradient value L of the white portion (the top section of FIG. 7(B)) matches the desired gradient value $L_t$ (bottom section of FIG. 7(B)) as described above.

B-5. Effects of the Embodiment

In the present embodiment, as described above, even if the area $S_p$ of the white portion in the imaged image deviates from the target area $S_{pt}$ due to a change in the zoom position of the zoom lens, the average gradient value L of the white portion in the imaged image is made approximately equivalent to the desired gradient value $L_t$ by changing the area of the white portion of the adjustment pattern image formed on the liquid crystal light valve such that the area $S_p$ of the white portion in the imaged image becomes approximately equivalent to the target area $S_{pt}$. Accordingly, even if the zoom position of the zoom lens 116 changes, it is possible to maintain the average gradient value of the white portion in the imaged image approximately at the desired gradient value $L_t$.

C. Variants

The present invention is not limited to the embodiments and modes described above, but may be worked in a variety of modes within a scope that does not deviate from the main gist.

C-1. Variant 1

In the embodiments described above, an image was used divided vertically into two colors top and bottom with the top portion black and the bottom portion white as the adjustment pattern image, but the present invention is not limited thereto. For the adjustment pattern image, any pattern image may be used appropriate to the content of the adjustment to be carried out.

Also, the length of the horizontal sides in the white portion of the adjustment pattern image formed on the liquid crystal light valve 114 were kept unchanged while changing the length of the vertical sides to change the light valve white area $S_q$, but the present invention is not limited thereto, and any shape may be used for the white portion wherein the light valve white area $S_q$ can be changed.

Still further, instead of white as described above, other specified colors such as, for example, green or gray may be used for the adjustment pattern image.

C-2. Variant 2

In the embodiments described above, the area $S_p$ of the white portion in the imaged image was controlled such as to become equivalent to the target area $S_{pt}$, but the present invention is not limited to such an area $S_p$ of the white portion; a value that is not the area itself but a value related to the area $S_p$ of the white portion may be used as well. In further detail, instead of the area $S_p$ of the white portion, a ratio (area ratio) of the area $S_p$ of the white portion to the area $S_z$ of the projection light region in the imaged image, the length of the horizontal side of the white portion and/or the length of the vertical side, or the number of pixels composing the white portion, for example, may be used. Further, the area of the black portion of the imaged image, or the number of pixels composing the black portion in the projection light region may be used as well.

If such a change is made to replace the area $S_q$ of the white portion with some other value, the target area $S_{pt}$ must be changed to a corresponding value therewith.

C-3. Variant 3

In the embodiments described above, the image controller 105 controlled the shutter speed, gain, aperture, and the like in the imager 104 and carried out automatic exposure, but the present invention is not limited thereto; any one of the shutter speed, gain, or aperture may be controlled and automatic exposure carried out, or two or more controlled as a combination and automatic exposure carried out.

C-4. Variant 4

The liquid crystal light valve 114 is used as the electrooptical device in the projector 100, but the present invention is not limited thereto; an image may be formed based on the image signals, and a variety of devices used for emitting light modulated according to the formed image. For example, a DMD (digital micromirror device) (trademark of Texas Instruments) may be used, or a CRT, plasma display panel, or the like may used as well.

What is claimed is:

1. A projector that projects projection light on a projection object to display an image, the projector comprising:
an image formation module that can form a predetermined pattern image for displaying on the projection object;
a zoom lens that can change the size of the projected light region on which the projection light is projected;
a controller;
an imager that images the projection object; and
an imaging controller that calculates an exposure calculation value from an image imaged by the imager and adjusts the exposure on the imager such that the calculated exposure calculation value is nearly equivalent to an exposure target value set by the controller, and
wherein the controller acquires the image imaged by the imager, and changes an area of a specified color portion represented with a specified color in the predetermined pattern image which is formed on the image formation module such that a specified value of a gradient value of a specified color portion represented with the specified color becomes approximately equivalent to a desired gradient value in the acquired imaged image.

2. The projector in accordance with claim 1, wherein the specified value of the gradient value of the specified color portion is either an average, maximum or intermediate value of the gradient values of the specified color portion.

3. The projector in accordance with claim 1, wherein the specified color is white.

4. The projector in accordance with claim 2, wherein the specified color is white.

5. A projector that projects projection light on a projection object to display an image, the projector comprising:
an image formation module that can form a predetermined pattern image for displaying on the projection object;
a zoom lens that can change the size of the projected light region on which the projection light is projected;
a controller;
an imager that images the projection object; and
an imaging controller that calculates an exposure calculation value from an image imaged by the imager and adjusts the exposure on the imager such that the calculated exposure calculation value is nearly equivalent to an exposure target value set by the controller, and
wherein the controller acquires an image imaged by the imager, and changes an area of a specified color portion represented with a specified color in the predetermined pattern image which is formed on the image formation module such that a parameter relating to an area of a specified color portion represented with the specified color in the acquired imaged image becomes approximately equivalent to a target parameter set in advance.

6. The projector in accordance with claim 5, wherein the specified color is white.

7. A pattern image display method of causing a predetermined pattern image to be displayed on a projection object for a projector, which projects projection light on the projection object to display an image and includes a zoom lens that can change the size of the projected light region on which the projection light is projected, an imager that images the projection object, and an imaging controller that calculates an exposure calculation value from an image imaged by the imager and adjusts the exposure on the imager such that the calculated exposure calculation value is nearly equivalent to an exposure target value, the pattern image display method comprising the steps of:

(a) forming the predetermined pattern image having a specified color portion represented with a specified color;
(b) displaying the formed predetermined pattern image on the projection object via the zoom lens;
(c) imaging the projection object on which the predetermined pattern image is displayed on the predetermined pattern image by the imager;
(d) acquiring an image imaged by the imager; and
(e) changing an area of the specified color portion in the formed predetermined pattern image such that a specified value of a gradient value of a specified color portion represented with the specified color in the acquired imaged image becomes approximately equivalent to a desired gradient value.

8. The pattern image display method in accordance with claim 7 wherein the specified value of the gradient value of the specified color portion is either an average, maximum or intermediate value of the gradient values of the specified color portion.

9. The pattern image display method in accordance with claim 7 wherein the specified color is white.

10. The pattern image display method in accordance with claim 8 wherein the specified color is white.

11. A pattern image display method of causing a predetermined pattern image to be displayed on a projection object for a projector, which projects projection light on the projection object to display an image and includes a zoom lens that can change the size of the projected light region on which the projection light is projected, an imager that images the projection object, and an imaging controller that calculates an exposure calculation value from an image imaged by the imager and adjusts the exposure on the imager such that the calculated exposure calculation value is nearly equivalent to an exposure target value, the pattern image display method comprising the steps of:

(a) forming the predetermined pattern image having a specified color portion represented with a specified color;
(b) displaying the formed predetermined pattern image on the projection object via the zoom lens;
(c) imaging the projection object on which the predetermined pattern image is displayed displayed on the predetermined pattern image by the imager;
(d) acquiring an image imaged by the imager; and
(e) changing an area of a specified color portion in the formed predetermined pattern image such that a parameter relating an area of to a specified color portion represented with the specified color in the acquired imaged image becomes approximately equivalent to a target parameter set in advance.

12. The pattern image display method in accordance with claim 11 wherein the specified color is white.

\* \* \* \* \*